United States Patent [19]

Orman et al.

[11] Patent Number: 5,007,335
[45] Date of Patent: Apr. 16, 1991

[54] APPARATUS FOR TREATING FRESH FRUIT AND THE LIKE TO PREVENT AND RETARD THE GROWTH OFF FUNGUS

[75] Inventors: Charles R. Orman, San Bernardino; Paul E. Johnson, Riverside; Bruce C. Adams, Pomona, all of Calif.

[73] Assignee: Sunkist Growers, Inc., Sherman Oaks, Calif.

[21] Appl. No.: 398,791

[22] Filed: Aug. 24, 1989

Related U.S. Application Data

[62] Division of Ser. No. 204,722, Jun. 10, 1988.

[51] Int. Cl.$^5$ ............................ A23B 7/00; A23B 7/16
[52] U.S. Cl. ......................................... 99/487; 99/516; 99/534; 99/623; 99/626; 15/3.14; 15/3.17; 15/3.20; 134/113
[58] Field of Search ............... 99/516, 534, 536, 483, 99/467, 468, 486, 487, 584, 623, 626; 15/3.13, 3.12, 3.14, 3.16, 3.2, 3.17, 3.4; 134/113; 68/13 R; 426/333, 308, 335, 310; 118/DIG. 6

[56] References Cited

U.S. PATENT DOCUMENTS

| | | |
|---|---|---|
| 683,899 | 10/1901 | Bishop . |
| 1,529,461 | 3/1925 | Brogden et al. ............................ 15/4 |
| 1,560,559 | 11/1925 | Fulton et al. . |
| 1,598,697 | 9/1926 | Barger et al. . |
| 1,632,579 | 6/1927 | Barger et al. . |
| 1,671,924 | 5/1928 | Brogden . |
| 1,693,575 | 11/1928 | Brogden et al. . |
| 1,696,704 | 12/1928 | Zellner . |
| 1,723,180 | 10/1929 | Brogden . |
| 1,732,118 | 10/1929 | Brogden . |
| 1,774,310 | 8/1930 | Bates . |
| 1,900,295 | 3/1933 | McDill . |
| 1,903,283 | 4/1933 | Brogden et al. . |
| 1,943,468 | 1/1934 | Bridgeman et al. . |
| 2,054,392 | 9/1936 | Sharma . |
| 2,110,871 | 3/1938 | de la Mota . |
| 2,210,133 | 8/1940 | Sharma . |
| 2,228,410 | 1/1941 | Sharma et al. . |
| 2,328,265 | 8/1943 | Ducker et al. . |
| 2,374,209 | 4/1945 | Kalmar . |
| 2,374,210 | 4/1945 | Kalmar . |
| 2,379,294 | 6/1945 | Gooding . |
| 2,386,954 | 10/1945 | Kalmar . |
| 2,488,876 | 11/1949 | Newhall et al. . |
| 2,503,663 | 6/1950 | Gericke . |
| 2,543,915 | 3/1951 | Leonard . |
| 2,703,760 | 3/1955 | Cunning . |
| 2,866,819 | 12/1958 | Montagna et al. . |
| 2,975,067 | 3/1961 | Winterberg . |
| 3,173,948 | 3/1965 | Probst et al. . |
| 3,320,307 | 5/1967 | Kerr . |
| 3,486,909 | 12/1969 | Luck . |
| 4,021,262 | 5/1977 | Morales et al. . |
| 4,120,970 | 10/1978 | Bice et al. . |
| 4,275,648 | 6/1981 | Mouri et al. . |
| 4,279,263 | 7/1981 | Pulliam . |
| 4,400,403 | 8/1983 | Robach . |
| 4,490,335 | 12/1984 | Marev et al. . |
| 4,796,042 | 1/1989 | Mappin et al. . |

OTHER PUBLICATIONS

A. J. Dawson & J. W. Eckert, "Problems of Decay Control In Marketing Citrus Fruits: Strategy and Solutions, California and Arizona", *Proc. Int. Soc. Citriculture*, 1, (1977), pp. 255-259.

(List continued on next page.)

*Primary Examiner*—Timothy F. Simone
*Attorney, Agent, or Firm*—Stephen J. Koundakjian; Paul R. Wylie; Paul V. del Guidice

[57] ABSTRACT

A method and apparatus are disclosed for treating fresh fruit to prevent and retard the growth of fungus. The techniques of the invention include simultaneously scrubbing the fresh fruit while drenching with a falling liquid containing a fungicide. Large volumes of liquid are used and the liquid can be recycled. The liquid also removes dirt and debris and, while containing a rather small amount of fungicide, such amount is present in a concentration sufficient to apply a coating to the fruit at the end of the scrubbing step given proper pH control. The pH of the solution is controlled. During the scrubbing step, the fruit is continuously rotated to provide even fungicidal deposit.

8 Claims, 3 Drawing Sheets

OTHER PUBLICATIONS

J. W. Eckert, M. J. Kolbezen, & B. A. Kramer, "Accumulation of O-Phenylphenol By Citrus Fruit and Pathogenic Fungi In Relation To Decay Control And Residues", *Proceedings First International Citrus Symposium,* (1969), pp. 1097–1103.

B. L. Wild & J. K. Long, "Citrus Mould Control With SOPP and Diphenyl", Agfacts H2.4.3, Department of Agriculture, New South Wales, First Edition (1985), pp. 1–5.

B. L. Wild, "Citrus Mould Control with Benzimidazole Fungicides", Agfacts, H.2.4.2, Department of Agriculture, New South Wales, First Edition (1983), pp. 1–4.

G. Eldon Brown, "Efficacy of Citrus Postharvest Fungicides Applied in Water or Resin Solution Water Wax", *Plant/Disease,* May (1984), pp. 415.

Citrus Packinghouse Management Decay Control Syllabus (Ontario, California: Sunkist Growers Inc., 1987).

Citrus Packing Handbook (Ontario, California: Sunkist Growers, Inc., Sep. 1983).

OPP Alternative Manual (Ontario, California: Sunkist Growers, Inc., Sep. 1983).

Product Label (McAllen, Texas; FMC Corporation, Citrus Machine Division, date unknown).

Foamex Product Label (Pomona, California: Brogdex Company, Aug. 1973), Form 101–68.

APPARATUS FOR TREATING FRESH FRUIT AND THE LIKE TO PREVENT AND RETARD THE GROWTH OFF FUNGUS

This is a divisional of copending application(s) Ser. No. 07/204,722 filed on 6-10-88, pending.

BACKGROUND OF THE INVENTION

Various fungi such as penicillia molds are the causal agents of the vast majority of losses due to decay in the citrus industry. These organisms attack all varieties of citrus fruit produced from each of the several geographically and climatically diverse citrus growing areas of California and Arizona. Although their greatest impact is felt when completely decayed fruit covered with the sporulating fungus are discovered at the markets, green and blue mold occur, often simultaneously, throughout every phase of postharvest operations. Strategies for the control of these diseases underlie virtually every procedure followed during the normal course of fruit processing and shipping.

This problem has long been a concern in the citrus industry, and has been the subject of early prior art attempts for its remedy. These attempts are set out in various prior art patents including U.S. Pat. Nos. 1,529,461; 2,488,876; 2,374,210; and 2,703,760. These patents are representative of only a few of the prior attempts directed toward the treatment of citrus fruit to eliminate spoilage. Currently, a favorite treating reagent is sodium orthophenylphenate known in the trade as SOPP which ionizes in solution to orthophenylphenol known as OPP.

In the past, treating compositions such as OPP have been brought into contact with fruit in relatively quiescent conditions, such as in the well-known soaking tanks used throughout the industry to immerse the fruit in solutions containing fungicides to thoroughly impregnate the solution and the fungicide, insofar as is possible, into the surface of the fruit. This method has required rather large soaking tanks in which the fruit must be placed for substantial periods of time. Considering the length of time the fruit must be in the soaking tanks, the size of the tanks and the tremendous quantity of fruit that is processed through modern-day packing houses, the soaking technique, while useful, is not cost effective.

Another technique commonly used in the citrus industry for applying coatings to fruit is that of "foaming". In this technique, a coating material including a fungicide, is applied to the fruit in the form of a liquid foam. Because the foam adheres to the surface of the fruit, being formed of high surface tension bubbles usually resulting from the addition of a surfactant, sufficient contact of the fungicide material is made with the skin of the fruit to apply a coating. An example of a foamer for applying the foam is shown in U.S. Pat. No. 2,488,876 to J. F. P. Newhall et al. In modern-day practice, fruit can be conveyed through a foamer washer for its final cleaning prior to packing. In the foamer SOPP is usually applied in the foam at a concentration of about 1% to about 3%. After rinsing and removing excess water, a shipping wax can be applied. However, there are problems with this prior art method in that due to the application of the fungicide in the form of a foam, it is desirable that the foam remain on the fruit in a somewhat quiescent condition to permit thorough wetting of the fruit surface. Thus, in the foaming technique, a relatively small amount of liquid is applied to the fruit and such liquid may not effectively treat the fruit and, because of its small amount, may not carry away dirt and debris that remain on the fruit. Moreover, the foam material is not recyclable and the foam solution not adhering to the fruit is lost.

U.S. Pat. No. 2,374,209 to Kalmar discusses a drenching operation wherein a solution containing 0.15% by weight of SOPP is flooded over fruit on brushes. However, this is but a secondary treatment with the fruit first having been soaked in a tank in the same SOPP solution.

Sharma, U.S. Pat. No. 2,228,410 discloses the drench treating of fruits and vegetables with a composition including OPP which also includes an oil constituent described as a relatively non-volatile petroleum distillate as an essential part of his treating solution.

Sharma, U.S. Pat. No. 2,054,392, also discloses treatment of fruit with SOPP, but shows no apparatus for such treatment.

It is also known to apply SOPP to fruit by immersion in a soak tank followed by rinsing the fruit with overhead water sprays while the fruit is passing over a brush bed. However, where rinse water is recirculated rind injury may result because the lower pH of the rinse water releases more OPP from the solution.

According to this invention, there is provided a novel method and apparatus for eliminating the noted prior art problems and particularly for applying a fungicide contained in a falling liquid which will respectively be present in quantities to both prevent and retard the growth of fungus, and remove debris from the fruit. Thus, in the novel one step drenching process of this invention which is conducted upon a scrubbing bed, as will be hereinafter described, both the fungicide application and debris removal can be accomplished in a single step. Eliminated, by means of the techniques of this invention, are absolute requirements for large soaking tanks or auxilliary debris removal steps prior to or after, the fungicidal application. The fungicide treating step according to the invention can be a primary treating step, prior to packing of the fruit and may be used without other additional preliminary or secondary fungicide treatments in packing houses.

SUMMARY OF THE INVENTION

This invention relates generally to improvements in methods and apparatus for treating fruit or the like to prevent and retard growth of fungus while at the same time removing debris from fruit.

The invention, in a preferred embodiment, includes both method and apparatus to attain such results which includes the techniques of passing fruit through a fruit scrubbing station wherein the fruit is scrubbed by scrubbing means such as brushes to remove debris. Simultaneously the fruit is drenched with a falling liquid containing a fungicide.

The falling liquid is applied in such quantity to remove all debris that are normally carried by the fruit which is then carried away by the cascading liquid. The liquid contains a fungicide present in an amount sufficient to apply a fungicidal coating to the fruit under the controlled conditions of the invention. The scrubbing means can be in the form of a brush bed comprised of a series of rotating brushes which rotates the fruit during the scrubbing step. The axis of rotation of the fruit is continuously changed whereby the entire surface will be evenly contacted by the falling liquid.

A feature of the method invention is the relative quantities of falling liquid that contact each of the fruit during the scrubbing step since it is the combination of the scrubbing plus the cascading liquid with its fungicidal content that provides a clean, fungus resistant fruit at the end.

A further method aspect of the invention is the rotation of the fruit during the scrubbing and drenching step to assure even coverage and cleaning of the individual fruit.

Thus, in accordance with the preferred method of the invention, it can be seen that there is provided a method which involves a falling liquid cascading over the fruit simultaneously with a scrubbing step which at the same time treats the fruit to prevent and retard the growth of fungus by reason of a fungicide being present in the drenching liquid.

In accordance with apparatus features of the invention, it has been determined that the falling liquid can best be applied by placing a reservoir having spaced apertures or perforations over a brush bed and continuously filling the reservoir with a liquid containing a fungicide in given quantities. In a further preferred form of the invention, arcuate surfaced brushes are provided as part of the brush bed to impart continuous changing of the axis of rotation of the fruit as it rotates from one brush to another. The falling liquid containing the fungicide not only applies fungicide to the fruit, but also applies it to the brush bed to prevent and retard fungus growth on the bed.

It will be apparent from the foregoing, and from the description which follows, that the drenching of fruit with large volumes of liquid, and the simultaneous application of a fungicide are somewhat inconsistent in principle of operation inasmuch as a cascading liquid such as contemplated by this invention will tend to pass the fruit with great force and velocity. While this is desirable for cleaning the fruit of debris, it is not necessarily desirable in applying a fungicide, which is normally done in more quiescent conditions, either in a soaking tank or with a foaming solution. Thus, in accordance with this invention it will be realized, that in order to impart fungicidal protection to the fruit both the concentration of fungicide and the volume of drenching liquid are important as well as the relative vigor of the scrubbing activity.

It was an object of this invention to provide a method and apparatus for treating fruit to prevent and retard the growth of fungus which would eliminate separate method steps for cleaning and brushing of the fruit and fungicide application.

A further object of this invention was the elimination of additional equipment required in the cleaning and fungicide treatment of fruit.

A still further object of this invention was the utilization of existing equipment for additional functions in the treatment of fruit. These and other objects of the invention have been met by the novel method and apparatus for treating fresh fruit and the like as described herein.

DETAILED DESCRIPTION OF THE INVENTION

Figure 1:
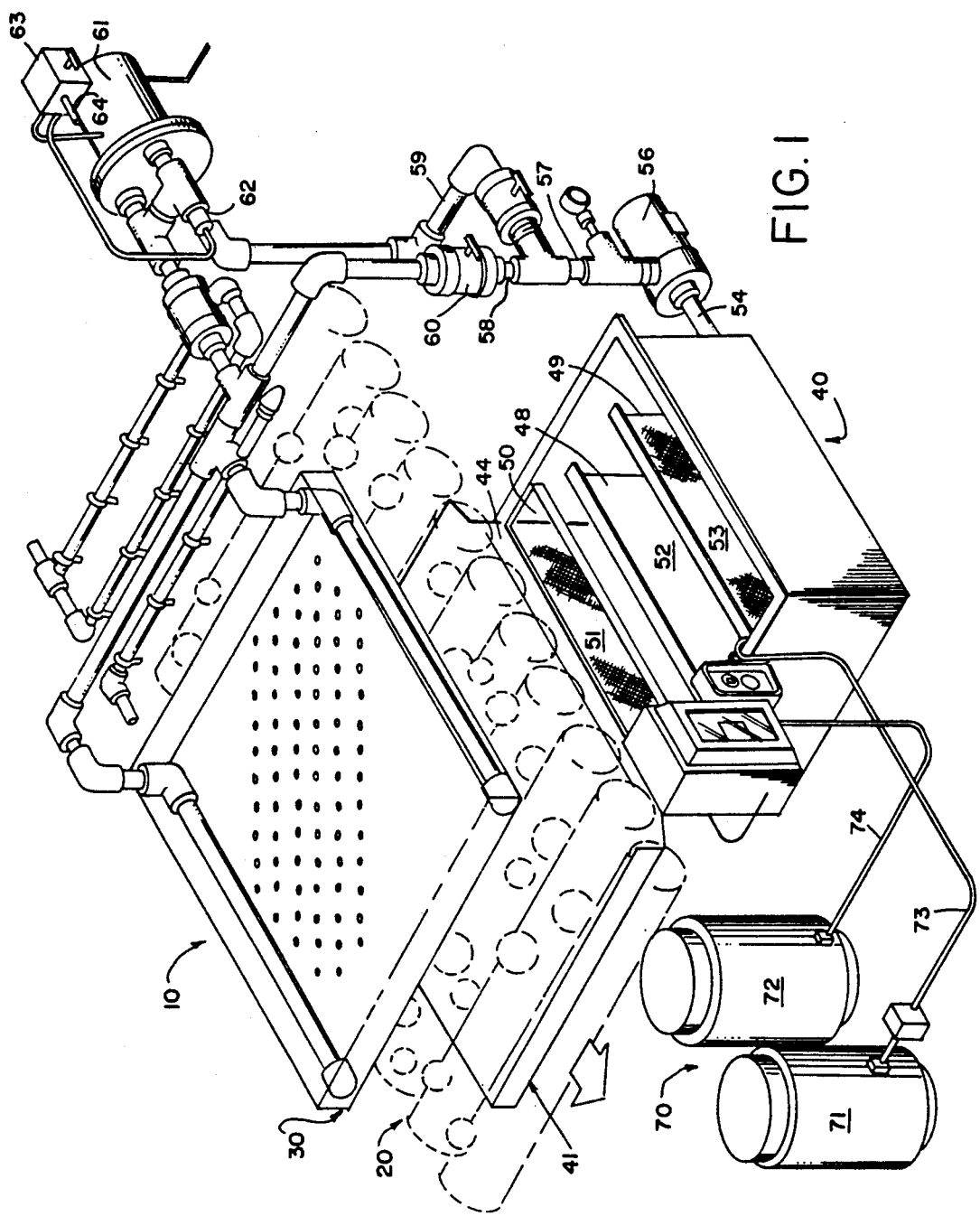
FIG. 1 is a schematic view in perspective showing the apparatus according to the invention.
Figure 2:
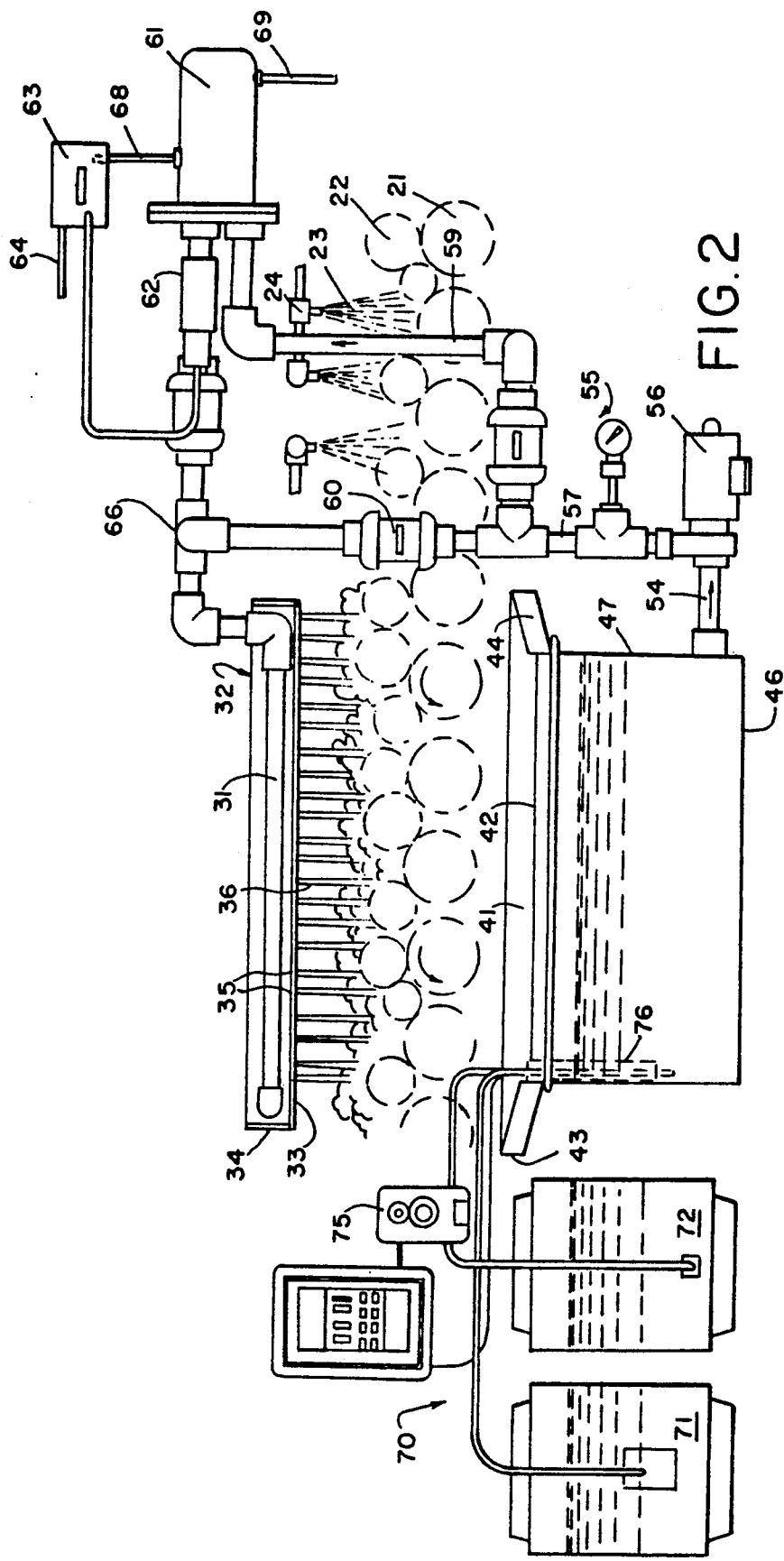
FIG. 2 is a side elevation of the apparatus shown in FIG. 1.
Figure 3:
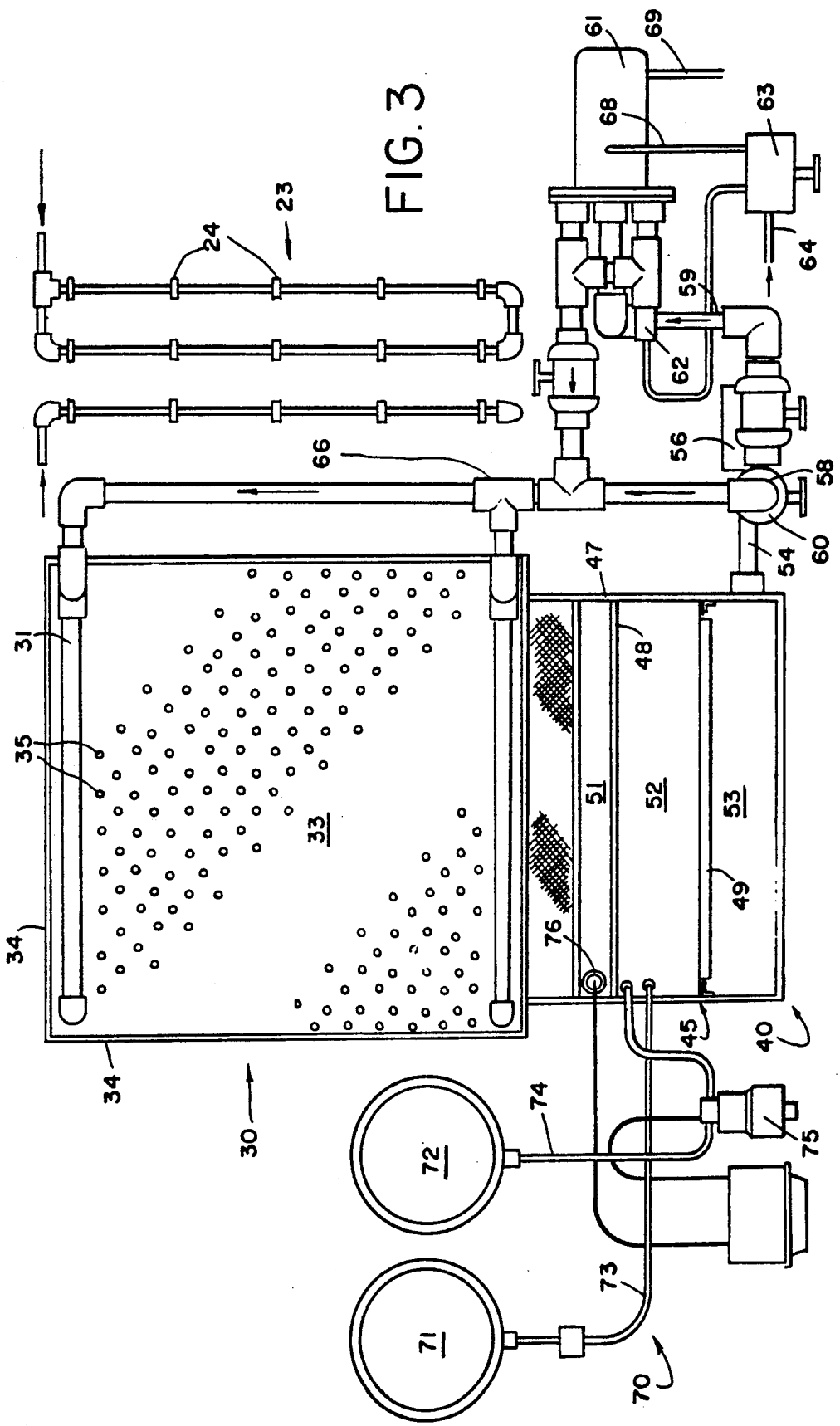
FIG. 3 is a top plan view of the apparatus of FIG. 1.

With reference to the drawings generally described above the following is a detailed description of the currently preferred form of the invention for treating citrus fruit such as oranges and lemons wherein there is provided an apparatus for treating fresh fruit to prevent and retard the growth of fungi. Such apparatus 10, includes a scrubbing station 20, drenching liquid distribution system 30, drenching liquid recycle system 40; and a reagent control system 70.

The scrubbing station 20, includes a series of rotating brushes 21. Such brushes are made from bristles and are continuously rotated in the direction shown by the arrow to move the fruit 22 successively from brush to brush. While the brushes 21 are rotating they are also brushing the surface of the fruit to remove debris such as dirt, leaves, stems and other undesirable particulate matter.

Each of the brushes 21 are approximately 3 to 8 ft. in length and about $4\frac{3}{4}$ inches in diameter with their axes spaced about 5 inches from each other.

In a preferred form of the invention scrubbing station 20 includes a precleaning station 23 which includes water and/or chlorine spray nozzles 24. Such spray nozzles 24 are positioned over the first few rotating brushes 21 to provide a spray on fruit 22 for an initial cleaning step.

Drenching liquid distribution system 30 includes a drenching liquid supply manifold 31 through which a drenching liquid can be supplied to distribution pan 32. Such pan 32 has a perforated bottom wall 33 and sidewalls 34. Perforated bottom wall 33 has a series of spaced perforations 35 which are positioned in said bottom wall 33 and have diameters such that a drenching liquid 36 will be evenly distributed over fruit 22 passing under drenching liquid distribution system 30 in an amount to accomplish the purposes of this invention. In a preferred form of the invention, distribution pan 32 is positioned only over approximately one-half of the brushes 21 which comprise the total brush bed; however, the perforations 35 extend the entire lateral distance of the brushes covered by distribution pan 32.

Perforations 35 are approximately 3/16 inches in diameter and spaced from each other about $\frac{1}{2}$ to about 5 inches. The bottom wall 38 of distribution pan 32 is positioned about 10 to about 30 inches above brushes 21.

The surfaces of rotating brushes 21 are typically arcuate so that in addition to the rotational motion that will be imparted to the fruit 22 by movement from brush to brush, the axis of rotation of the fruit will also be changed as the fruit passes over the brushes thereby tumbling the fruit in a manner such that all surfaces of the fruit 22 will come into contact with brushes 21 as well as with falling liquid 36.

Positioned beneath scrubbing station 20 is drenching liquid recycle mean 40 which includes a liquid collection pan 41 including bottom wall 42 and sidewalls 43. Liquid collection pan 41 also includes, at one end thereof, spout 44 which directs liquid collected in the pan to liquid/ solid separation tank 45.

Liquid/solid separation tank 45 includes a bottom wall 46, sidewalls 47, baffle 48 and a dividing screen 49. One sidewall 47 of tank 45 supports a horizontal screen 50 which is positioned adjacent to the end of spout 44. Baffle 48 defines a compartment 51 within tank 45 and screen 49 defines compartments 52 and 53 within tank 45 with are in fluid communication with each other through the screen. Clarified drenching liquid is removed from compartment 53 via a conduit 54 to recycle system 55 which includes a motor driven pump 56 to drive the liquid upward through conduit 57 and through either or both of conduits 58 and 59. Valve 60 controls the flow through conduit 58, and thus when valve 60 is closed or partly closed the flow of fluid is directed through conduit 59 and through heat exchanger 61 wherein the temperature of the recycled liquid can be adjusted to a desired temperature. Temperature is measured by thermocouple 62 which is electrically connected to control value 63 which in turn supplies steam from conduit 64 to heat exchanger 61 to obtain the desired temperature. Liquid passing from heat exchanger 61 goes through conduit 65 to conduit 66 as does liquid passing through automatic valve 60 and conduit 67. Liquid in conduit 66 is then distributed to drenching liquid supply manifolds 31.

Steam from conduit 64 is supplied by conduit 68 to heat exchanger 61 and exhausted from heat exchanger 61 by conduit 69.

A reagent control system 70 is provided for the introduction of SOPP and caustic into the recycling liquid. The system 70 includes container 71 for SOPP and a container 72 for caustic. Each such container is in fluid communication with compartment 52 through conduits 73 and 74 respectively. Flow of caustic solution through conduit 74 is controlled by automatic metering pump 75 in response to measurements of the pH in compartments 52 by pH probe 76. Make up SOPP and water are mixed in a liquid pump (not shown) and added to compartment 52 via conduit 73.

In operation, fruit 22 is loaded onto the bed of continuously moving rotating brushes 21 in gang fashion extend longitudinally across the brushes. According to a preferred optional embodiment of the invention, the fruit is first sprayed at precleaning station 23 by a pressurized spray of water to remove some of the particles and debris on the fruit surface. The brushes 21 serve to loosen debris which includes dirt, leaves, stems and other particulate material from the surface of the fruit. As the fruit reaches the area of the brush bed below the drenching liquid distributor 30 it is drenched by falling liquid from distribution pan 32. Such liquid is passed evenly over the fruit 22 on brushes 21 by means of perforations 35 in the bottom 33 of distribution pan 32. As the fruit is being brushed, the cascading liquid 36 simultaneously drenches the fruit with a fungicide as herein described and carries away the debris that has been loosen by the brushes. The action also serves to further function of intimately contacting the drenching liquid 36 which contains a fungicide with the pores and interstices of the fruit skin thereby providing an even and thorough coating of the fungicide on the fruit. It should be noted that the size of the perforations 35 and the depth of distribution pan 32 together with the addition of liquid to distribution pan 32 from conduit 66 can control the cascading liquid such that the desired force and velocity of the liquid are at optimum conditions whereby the loosened debris will be carried away while at the same time the liquid will maintain sufficient contact with fruit 22 which, together with the concentration of fungicide in the liquid and the brushing action, will adequately treat the fresh fruit to prevent and retard the growth of fungi.

Liquid carrying debris from the fruit 22 falls between and upon brushes 21. This is an important aspect of the invention inasmuch as brushes 21 themselves are being continuously treated with the fungicide component of the liquid to thereby reduce and retard the growth of fungi on the brushes 21.

After liquid 36 passes the brushes 21 the liquid is collected in liquid collection pan 41 and flows from there to spout 44 and into compartment 51 of liquid/solid separation tank 45 through screen 50. Large particulate matter such as stems and leaves are retained on screen 50 from where they can be manually removed. The remaining liquid drops into compartment 51, which is formed between a sidewall 47 of liquid solid separation tank 45 and baffle 48. Compartment 51 thereafter serves as a clarification tank for the liquid and particulates in the liquid are allowed to settle to the bottom of the tank with clarified liquid falling over baffle 51 into compartment 52. It is noted, compartment 52 and compartment 53 are divided by a screen 49, which serves to retain any particulate matter in compartment 52 and permit the passage of only clarified screened liquid into compartment 53 from where it is withdrawn via conduit 54 to enter the remainder of the drenching liquid recycle means 40 described above.

Recycled drenching liquid in conduit 54 is pumped by motor driven pump 56 through conduit 57 and upwardly through either or both of conduits 58 and 59. Automatic valve 60 controls the flow of liquid through conduit 58 and proportions the flow between conduits 58 and 59 such that all or part or none of the recycled drenching liquid can flow through conduit 59 to heat exchanger 61. In heat exchanger 61, the temperature of the liquid is continuously sensed by thermocouple 62 which provides data to control box 63 which in turn actuates heater unit 64. Thus, all or a portion of the recycled liquid can be heated in heat exchanger 61 and liquid at the proper temperature can be passed through conduit 66 to drenching liquid supply manifolds 31 and into distribution pan 32 where it cascades down on a continuous manner onto fruit 22 moving on the bed formed by brushes 21 below.

According to preferred applications and embodiments of this invention, the SOPP concentration in the drenching liquid is maintained in the range of about 0.5 grams per liter to about 2 grams per liter. The pH of said drenching liquid is maintained in the range of about 11.6 to about 12.0 with the range of about 11.8 to 12.0 being preferred for citrus fruits such as lemons and oranges. Flow rate of the drenching liquid over the ganged fruit on brushes 21 is about 3 to about 5 gallons per minute per square foot of drenching surface. The temperature of the drenching liquid is maintained in the temperature range of about 65° F. to about 110° F. The drenching liquid contacting the fruit is in a quantity of 1 gallon of drenching liquid to about 4 to about 24 pounds of fruit while the fruit is on brushes 21. The concentration of OPP fungicide applied to the fruit is in turn determined by SOPP addition and the maintenance of OPP concentration in the recycled drenching liquid, and temperature and pH of the liquid. The preferred time for contact of the drenching liquid with the fruit is in the range of about 9 to about 30 seconds.

While the utility of the invention has been generally described in relation to the treatment of fresh citrus fruit such as for example oranges and lemons, it is also contemplated that it is useful for treating fresh deciduous fruits including pome fruits such as apples and pears, some fruits such as plums, peaches and apricots and subtropical fruits such as avocados and a number of melons including cantaloupe, crenshaw, honeydew, catawba and watermelon, and additionally fresh produce such as for example zucchini, cumbers, squash and carrots.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. An apparatus for treating debris laden fresh fruit in a primary treating step to prevent and retard the growth of fungi comprising in combination:
   (a) means for scrubbing said debris laden fruit in a fruit scrubbing station wherein said fruit is contacted by scrubbing means to remove the debris from said fruit;
   (b) means for simultaneously with said scrubbing means drenching said fruit with a falling liquid in a quantity sufficient to remove substantially all debris carried by said fruit, said liquid containing a funicide;
   (c) means for simultaneously maintaining the quantity and concentration of fungicide of said falling liquid in an amount to apply fungicide from said falling liquid to said fruit;
   (d) means for simultaneously maintaining the conditions of said falling liquid within a range to deposit said fungicide on said fruit sufficient to prevent fungus growth on said fruit, said means for applying said fungicide being capable of applying fungicide in an amount not exceeding that which would deleteriously affect the quality of said fruit; and
   (e) means for simultaneously treating said scrubbing means with said fungicide to prevent and retard the growth of fungus on said scrubbing means.

2. An apparatus according to claim 1 further comprising means for collecting said falling liquid after it passes said fruit and said scrubbing station; and, means for recycling said liquid for reuse as said falling liquid.

3. An apparatus according to claim 2 further comprising means for clarifying said collected falling liquid prior to recycling.

4. An apparatus according to claim 2 further comprising means for adjusting the temperature of said falling liquid so as to obtain the optimum temperature for application of fungicide from said falling liquid.

5. An apparatus according to claim 2 further comprising means for simultaneously adjusting the concentration of fungicide in said recycled liquid.

6. An apparatus according to claim 2 further comprising means for simultaneously adjusting the pH of said recycled liquid.

7. An apparatus for the primary treatment of debris laden fresh fruit to prevent and retard the growth of fungi comprising in combination:
   (a) means for scrubbing said debris laden fruit in a fruit scrubbing station wherein said fruit is contacted by scrubbing means to remove the debris from said fruit;
   (b) means for simultaneously with said scrubbing means drenching said fruit with a falling liquid in a quantity sufficient to remove substantially all debris carried by said fruit, said liquid containing a fungicide;
   (c) means for simultaneously maintaining the quantity and concentration of fungicide of said falling liquid in an amount to apply a fungicide coating to said fruit during said scrubbing;
   (d) means for simultaneously maintaining the control of temperature of said falling liquid within a range to deposit said fungicide coating on said fruit sufficient to prevent fungus growth on said fruit, said fungicide amount not exceeding that which would deleteriously affect the quality of said fruit;
   (e) means for simultaneously treating said scrubbing means with said fungicide to prevent and retard the growth of fungus on said scrubbing means;
   (f) means for collecting said falling liquid after it passes said fruit scrubbing station and said brush bed;
   (g) means for clarifying said falling liquid after it passes said fruit scrubbing station and said brush bed; and
   (h) means for directly recycling said clarified liquid so it becomes said falling liquid.

8. An apparatus according to claim 4 further comprising means for simultaneously adjusting the pH of said falling liquid to obtain optimum fungicide coating on said fruit.

* * * * *